US008412638B2

(12) United States Patent
Yeap et al.

(10) Patent No.: US 8,412,638 B2
(45) Date of Patent: Apr. 2, 2013

(54) METHOD AND SYSTEM FOR VALIDATING A DEVICE THAT USES A DYNAMIC IDENTIFIER

(75) Inventors: Tet Hin Yeap, Ottawa (CA); William G. O'Brien, Nanaimo (CA)

(73) Assignee: BCE Inc., Verdun, Quebec (CA)

( * ) Notice: Subject to any disclaimer, the term of this patent is extended or adjusted under 35 U.S.C. 154(b) by 1068 days.

(21) Appl. No.: 12/343,268

(22) Filed: Dec. 23, 2008

(65) Prior Publication Data
US 2009/0216679 A1 Aug. 27, 2009

Related U.S. Application Data

(63) Continuation-in-part of application No. PCT/CA2007/002343, filed on Dec. 20, 2007.

(51) Int. Cl.
*G06Q 20/00* (2012.01)
(52) U.S. Cl. ........... 705/71; 726/2; 726/4; 726/5; 726/9; 726/10; 726/27; 726/30; 705/64; 705/75; 705/76; 235/375; 235/382; 235/382.5
(58) Field of Classification Search .................. 726/2, 4, 726/5, 9, 10, 27, 30; 705/64, 65, 67; 235/375, 235/382, 382.5
See application file for complete search history.

(56) References Cited

U.S. PATENT DOCUMENTS

| 4,771,458 A | * | 9/1988 | Citta et al. ..................... 380/239 |
| 5,222,137 A | | 6/1993 | Barrett et al. |
| 5,491,750 A | | 2/1996 | Bellare et al. |
| 5,694,471 A | | 12/1997 | Chen et al. |
| 5,778,069 A | | 7/1998 | Thomlinson et al. |
| 5,805,702 A | | 9/1998 | Curry et al. |
| 5,822,430 A | | 10/1998 | Doud |
| 5,832,090 A | | 11/1998 | Raspotnik |
| 5,892,900 A | * | 4/1999 | Ginter et al. ..................... 726/26 |
| 5,966,082 A | | 10/1999 | Cofino et al. |
| 6,141,695 A | * | 10/2000 | Sekiguchi et al. ............ 709/246 |
| 6,393,564 B1 | * | 5/2002 | Kanemitsu et al. ........... 713/168 |
| 6,778,096 B1 | | 8/2004 | Ward et al. |
| 6,842,106 B2 | | 1/2005 | Hughes et al. |
| 6,950,522 B1 | | 9/2005 | Mitchell et al. |
| 6,981,151 B1 | | 12/2005 | Groeneveld et al. |

(Continued)

FOREIGN PATENT DOCUMENTS
CA 2290170 C 7/2000
EP 1 626 363 A1 2/2006
(Continued)

OTHER PUBLICATIONS

International Search Report mailed on Feb. 17, 2009 in connection with International Application No. PCT/CA2008/002225.

(Continued)

*Primary Examiner* — Mamon Obeid

(57) ABSTRACT

A method that comprises obtaining a currently received signature from a device; obtaining a candidate identifier associated with the device; consulting a database to obtain a set of previously received signatures associated with the candidate identifier; and validating the currently received signature based on a comparison of the currently received signature to the set of previously received signatures associated with the candidate identifier. Also, a method that comprises obtaining a currently received signature from a device; decrypting the currently received signature to obtain a candidate identifier; and a candidate scrambling code; consulting a database to obtain a set of previously received scrambling codes associated with the candidate identifier; and validating the currently received signature based on a comparison of the candidate scrambling code to the set of previously received scrambling codes associated with the candidate identifier.

39 Claims, 11 Drawing Sheets

U.S. PATENT DOCUMENTS

| | | | |
|---|---|---|---|
| 7,000,114 B1 | 2/2006 | Hasebe et al. | |
| 7,178,169 B1 | 2/2007 | Salmonsen et al. | |
| 7,246,744 B2 | 7/2007 | O'Brien et al. | |
| 7,365,636 B2 | 4/2008 | Doi et al. | |
| 7,492,258 B1 | 2/2009 | Shoarinejad et al. | |
| 7,800,499 B2* | 9/2010 | Rehman | 340/572.1 |
| 7,876,220 B2 | 1/2011 | Aldridge | |
| 7,937,583 B2* | 5/2011 | Thornton et al. | 713/156 |
| 7,941,663 B2* | 5/2011 | Sarikaya | 713/169 |
| 7,953,974 B2 | 5/2011 | Yamamura et al. | |
| 8,074,889 B2* | 12/2011 | Beenau et al. | 235/487 |
| 2002/0041683 A1* | 4/2002 | Hopkins et al. | 380/28 |
| 2002/0087867 A1 | 7/2002 | Oberle et al. | |
| 2002/0095507 A1 | 7/2002 | Jerdonek | |
| 2002/0112174 A1* | 8/2002 | Yager et al. | 713/200 |
| 2002/0147917 A1* | 10/2002 | Brickell | 713/193 |
| 2002/0184509 A1 | 12/2002 | Scheidt et al. | |
| 2003/0120925 A1* | 6/2003 | Rose et al. | 713/176 |
| 2003/0169885 A1* | 9/2003 | Rinaldi | 380/278 |
| 2003/0182565 A1* | 9/2003 | Nakano et al. | 713/193 |
| 2003/0204743 A1* | 10/2003 | Devadas et al. | 713/200 |
| 2004/0066278 A1 | 4/2004 | Hughes et al. | |
| 2004/0181681 A1 | 9/2004 | Salisbury | |
| 2004/0252025 A1 | 12/2004 | Silverbrook et al. | |
| 2005/0123133 A1 | 6/2005 | Stewart et al. | |
| 2005/0154896 A1 | 7/2005 | Widman et al. | |
| 2005/0190892 A1 | 9/2005 | Dawson et al. | |
| 2006/0049256 A1 | 3/2006 | von Mueller et al. | |
| 2006/0116899 A1 | 6/2006 | Lax et al. | |
| 2006/0124756 A1 | 6/2006 | Brown | |
| 2006/0235805 A1 | 10/2006 | Peng et al. | |
| 2006/0271386 A1 | 11/2006 | Bhella | |
| 2007/0008135 A1 | 1/2007 | Sajkowsky | |
| 2007/0022045 A1 | 1/2007 | Lapstun et al. | |
| 2007/0023508 A1 | 2/2007 | Brookner | |
| 2007/0057768 A1 | 3/2007 | Zeng et al. | |
| 2007/0085689 A1 | 4/2007 | Brommer et al. | |
| 2007/0095928 A1 | 5/2007 | Balinsky et al. | |
| 2007/0103274 A1 | 5/2007 | Berthold | |
| 2007/0194882 A1* | 8/2007 | Yokota et al. | 340/5.61 |
| 2007/0198436 A1* | 8/2007 | Weiss | 705/75 |
| 2007/0214474 A1* | 9/2007 | McClenny et al. | 725/31 |
| 2007/0234058 A1 | 10/2007 | White | |
| 2007/0277044 A1 | 11/2007 | Graf et al. | |
| 2008/0011835 A1 | 1/2008 | Kwon et al. | |
| 2008/0013807 A1 | 1/2008 | Bonalle et al. | |
| 2008/0061935 A1 | 3/2008 | Melendez et al. | |
| 2008/0244271 A1 | 10/2008 | Yu | |
| 2008/0266055 A1 | 10/2008 | Turner et al. | |
| 2009/0048971 A1 | 2/2009 | Hathaway et al. | |
| 2009/0159666 A1 | 6/2009 | O'Brien et al. | |
| 2009/0160615 A1 | 6/2009 | O'Brien et al. | |
| 2009/0160649 A1 | 6/2009 | O'Brien et al. | |
| 2009/0161872 A1 | 6/2009 | O'Brien et al. | |
| 2009/0240946 A1 | 9/2009 | Yeap et al. | |
| 2010/0073147 A1 | 3/2010 | Guajardo Merchan et al. | |
| 2010/0150342 A1* | 6/2010 | Richards et al. | 380/30 |
| 2010/0205047 A1* | 8/2010 | Khoo | 705/14.1 |
| 2011/0185180 A1* | 7/2011 | Gullberg | 713/176 |
| 2011/0264907 A1* | 10/2011 | Betz et al. | 713/153 |

FOREIGN PATENT DOCUMENTS

| | | |
|---|---|---|
| EP | 1708468 A1 | 10/2006 |
| EP | 1 941 698 B1 | 10/2011 |
| WO | 99/43113 A1 | 8/1999 |
| WO | 2006/024816 A2 | 3/2006 |
| WO | 2006/039771 A1 | 4/2006 |
| WO | 2007/038896 A2 | 4/2007 |

OTHER PUBLICATIONS

Written Opinion of the International Searching Authority mailed on Feb. 17, 2009 in connection with International Application No. PCT/CA2008/002225.

European Search Report completed on Feb. 26, 2010 in connection with European Patent Application No. 09 18 0219, 10 pages.

Zhou Wang et al., "Cooperation Enhancement for Message Transmission in VANETs", Wireless Personal Communications, Kluwer Academic Publishers, DO, vol. 43, No. 1, Dec. 20, 2006, iSSN: 1572-834X, pp. 141-156.

Final Office Action dated Apr. 5, 2010 in connection with U.S. Appl. No. 12/314,458, 4 pages.

Non-Final Office Action issued by the United States Patent and Trademark Office on Apr. 5, 2011 in connection with U.S. Appl. No. 12/314,457, 17 pages.

International Search Report mailed on Aug. 20, 2009 in connection with International Patent Application No. PCT/CA2008/002224, 3 pages.

Written Opinion of the International Searching Authority mailed on Aug. 20, 2009 in connection with International Patent Application No. PCT/CA2008/002224, 6 pages.

Notice of Allowance issued by the United States Patent and Trademark Office on Sep. 20, 2011 in connection with U.S. Appl. No. 12/314,457, 11 pages.

International Search Report mailed on Aug. 31, 2009 in connection with International Patent Application No. PCT/CA2008/002226.

Written Opinion of the International Searching Authority mailed on Aug. 31, 2009 in connection with International Patent Application No. PCT/CA2008/002226.

Non-Final Office Action issued by the United States Patent and Trademark Office on Dec. 1, 2011 in connection with U.S. Appl. No. 12/314,456, 27 pages.

Non-Final Office Action issued by the United States Patent and Trademark Office on Dec. 1, 2011 in connection with U.S. Appl. No. 12/314,455, 25 pages.

Non-Final Office Action issued by the United States Patent and Trademark Office on Dec. 16, 2011 in connection with U.S. Appl. No. 12/343,187, 15 pages.

Non-Final Office Action issued by the United States Patent and Trademark Office on Feb. 8, 2012 in connection with U.S. Appl. No. 12/643,225, 18 pages.

Extended European Search Report issued by the European Patent Office on Nov. 28, 2011 in connection with European Patent Application Serial No. 07855623.0, 11 pages.

Extended European Search Report issued by the European Patent Office on Jan. 23, 2012 in connection with European Patent Application Serial No. 08865340.7, 6 pages.

Office Action mailed on Oct. 15, 2009 in connection with U.S. Appl. No. 12/314,458.

International Search Report of corresponding International Application No. PCT/CA2007/002343 mailed on Sep. 30, 2008, 32 pages.

Written Opinion of the International Searching Authority of corresponding International Application No. PCT/CA2007/002343 mailed on Sep. 30, 2008, 8 pages.

"3M Digital Materials Flow Management", © 2000, 3M IPC., 2 pages, 3M Library Systems, St. Paul, MN, U.S.A., www.3M.com/library.

Fred Niederman et al., "Examining RFID Applications in Supply Chain Management", Communications of the ACM, Jul. 2007/vol. 50, No. 7, pp. 93-101.

"Real-Time Location Identification for IP Phones" Redsky Network Discovery, © 2006 RedSky Technologies, Inc., Chicago, IL, U.S.A., 2 pages, www.redskyE911.com.

"Contactless Smart Cards vs. EPC Gen 2 RFID Tags: Frequently Asked Questions", Smart Card Alliance Identity Council, Jul. 2006, Smart Card Alliance © 2006, 6 pages.

Javed Sikander, "RFID Enabled Retail Supply Chain", © 2007 Microsoft Corp., Apr. 2005, Aug. 2, 2007, 21 pages, http://msdn2.microsoft.com/en-us/library/ms954628(d=printer).aspx.

Marcel Queisser et al., "Cataloging RFID Privacy and Security", Databases and Distributed Systems Group, as early as Apr. 18, 2007, 6 pages, Germany.

Tom Kevan, "Sorting out the RFID tag debate: read-only or read/write? Weigh all . . . ", Aug. 1, 2007, 2 pages, http://findarticles.com/p/articles/mi_m0DIS/is_12_4/ai_112366616/print.

Final Office Action issued by the United States Patent and Trademark Office on Mar. 21, 2012 in connection with U.S. Appl. No. 12/314,455, 25 pages.

Final Office Action issued by the United States Patent and Trademark Office on Jul. 6, 2012 in connection with U.S. Appl. No. 12/314,456, 20 pages.

Final Office Action issued by the United States Patent and Trademark Office on Sep. 4, 2012 in connection with U.S. Appl. No. 12/343,187, 17 pages.

Final Office Action issued by the United States Patent and Trademark Office on Sep. 13, 2012 in connection with U.S. Appl. No. 12/643,225, 24 pages.

Non-Final Office Action issued by the United States Patent and Trademark Office on Nov. 9, 2012 in connection with U.S. Appl. No. 13/001,013, 23 pages.

Non-Final Office Action issued by the United States Patent and Trademark Office on Dec. 19, 2012 in connection with U.S. Appl. No. 12/314,456, 17 pages.

* cited by examiner

METHOD AND SYSTEM FOR VALIDATING A DEVICE THAT USES A DYNAMIC IDENTIFIER

CROSS-REFERENCE TO RELATED APPLICATION

The present application is a continuation-in-part, and claims the benefit under 35 USC 120, of PCT International Application PCT/CA2007/002343, filed on Dec. 20, 2007 and hereby incorporated by reference herein.

FIELD OF THE INVENTION

The present invention relates generally to communication over a network and, more specifically, to a method for identification of a device when communicating with a network entity over the network.

BACKGROUND

In many everyday applications, such as access control, payment and tracking, devices involved in those applications need to be identified. Devices are typically assigned an identifier for such purposes. Thus, when the time comes for a device to be identified, the device transmits its assigned identifier to a network entity, which takes a decision as to whether the device (or a user thereof) is authorized to access a physical resource, view online content, utilize funds, etc.

In many situations, at least a portion of the pathway between a given device and the network entity might not be secure. For example, RFID, Bluetooth, WiFi, WiMax, Internet all present potential security risks whereby a malicious individual could detect and copy identifiers transmitted by the given device. Once the malicious individual gains knowledge of the given device's identifier, it is possible that he or she can simulate the given device and potentially gain access to a secured resource facility or vehicle, conduct unauthorized payments, impersonate the given device, etc.

Thus, an improved approach to the identification of devices would be welcome in the industry.

SUMMARY OF THE INVENTION

According to a first aspect, the present invention seeks to provide a method, comprising: obtaining a currently received signature from a device; obtaining a candidate identifier associated with the device; consulting a database to obtain a set of previously received signatures associated with the candidate identifier; and validating the currently received signature based on a comparison of the currently received signature to the set of previously received signatures associated with the candidate identifier.

According to a second aspect, the present invention seeks to provide a computer-readable storage medium comprising computer-readable program code which, when interpreted by a computing apparatus, causes the computing apparatus to execute a method that includes: obtaining a currently received signature from a device; obtaining a candidate identifier associated with the device; consulting a database to obtain a set of previously received signatures associated with the candidate identifier; and validating the currently received signature based on a comparison of the currently received signature to the set of previously received signatures associated with the candidate identifier.

According to a third aspect, the present invention seeks to provide a system for processing signatures received from devices, comprising: an interrogation portion configured to obtain a currently received signature from a particular device and a candidate identifier associated with the particular device; and a processing portion configured to consult a database in order to obtain a set of previously received signatures associated with the candidate identifier; and to validate the currently received signature based on a comparison of the currently received signature to the set of previously received signatures associated with the candidate identifier.

According to a fourth aspect, the present invention seeks to provide a method, comprising: obtaining a currently received signature from a device; decrypting the currently received signature to obtain a candidate identifier; and a candidate scrambling code; consulting a database to obtain a set of previously received scrambling codes associated with the candidate identifier; and validating the currently received signature based on a comparison of the candidate scrambling code to the set of previously received scrambling codes associated with the candidate identifier.

According to a fifth aspect, the present invention seeks to provide a computer-readable storage medium comprising computer-readable program code which, when interpreted by a computing apparatus, causes the computing apparatus to execute a method that includes: obtaining a currently received signature from a device; decrypting the currently received signature to obtain a candidate identifier; and a candidate scrambling code; consulting a database to obtain a set of previously received scrambling codes associated with the candidate identifier; and validating the currently received signature based on a comparison of the candidate scrambling code to the set of previously received scrambling codes associated with the candidate identifier.

According to a sixth aspect, the present invention seeks to provide a system for processing signatures received from devices, comprising: an interrogation portion configured to obtain a currently received signature from a particular device; and a processing portion configured to: decrypt the currently received signature in order to obtain a candidate identifier and a candidate scrambling code; consult a database in order to obtain a set of previously received scrambling codes associated with the candidate identifier; and validate the currently received signature based on a comparison of the candidate scrambling code to the set of previously received scrambling codes associated with the candidate identifier.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 5:
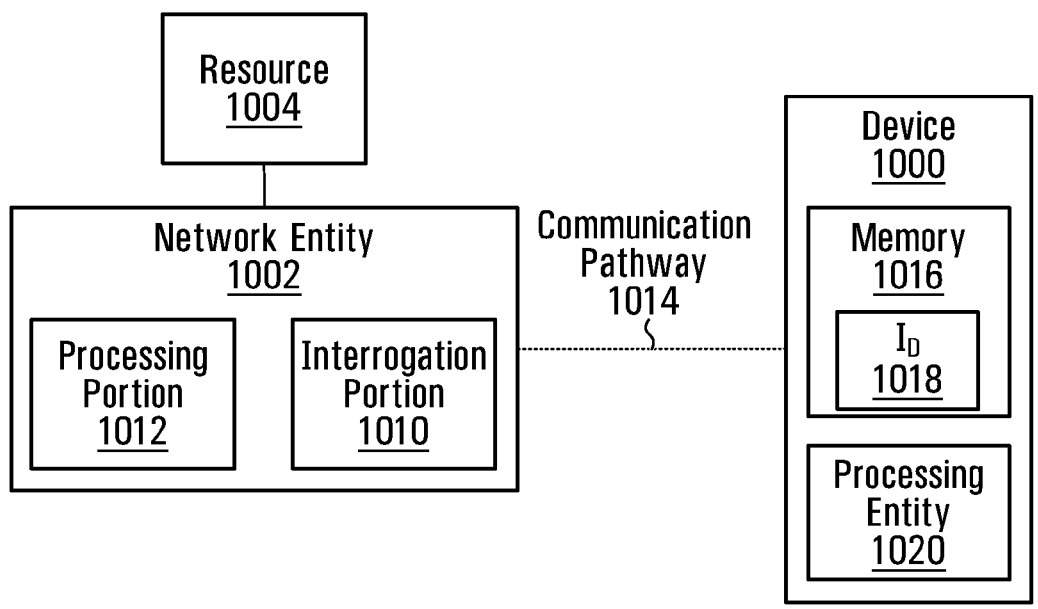
FIG. 5 is a block diagram of a system comprising a device in communication with a network entity.

With reference to FIG. 5, there is shown a system comprising a device 1000 in communication with a network entity 1002. The network entity 1002 controls access to a resource 1004. The resource 1004 can be any desired resource to which the device 1000 (or a user thereof) may wish to gain access. Non-limiting examples of the resource 1004 include real property (e.g., computing equipment, a computer network, a building, a portion of a building, an entrance, an exit, a vehicle, etc.), online property (e.g., access to a network such as the Internet or a virtual private network, a user account on a website, etc.) and financial property (e.g., a credit card account, bank account, utility company account, etc.).

The network entity 1002 may in some embodiments comprise an interrogation portion 1010 and a processing portion 1012. Depending on the embodiment, the interrogation portion 1010 may take the form of an RFID reader, a server, a modem, a WiFi node, a WiMax node, a base station, an infrared/Bluetooth receiver, etc. The interrogation portion 1010 communicates with the network device 1002 over a communication pathway 1014. In a non-limiting example, the communication pathway 1014 may traverse the Internet. Alternatively or in addition, the communication pathway 1014 may traverse the public switched telephone network (PSTN). The communication pathway 1014 may include one or more portions, any one or more of which may physically consist of one or more of a wireless, guided optical or wired link. Non-limiting examples of a wireless link include a radio frequency link and a free-space optical link, which may be established using any suitable protocol, including but not limited to RFID, Bluetooth, WiFi, WiMax, etc. Furthermore, the wireless link may be fixed wireless or mobile wireless, to name but two non-limiting possibilities.

The processing portion 1012 of the network entity 1002 is in communication with the interrogation portion 1010 and obtains therefrom data obtained as a result of interaction with the device 1000. The processing portion 1012 has the ability to process the data obtained by the interrogation portion 1010 and to determine whether or not to grant access to the resource 1004.

The device 1000 can be any suitable device that is susceptible of being used to access the resource 1004. In one non-limiting example, the device may take the form of a contactlessly readable tag (e.g., an RFID tag) that can be affixed to or integrated with: an item for sale, transported merchandise, a person's clothing, an animal (including livestock), a piece of equipment (including communications equipment such as wireless communications equipment), a vehicle, an access card and a credit card, to name jut a few non-limiting examples. In another non-limiting example, the device 1000 may take the form of a communication device (e.g., a mobile telephone (including smart phones and networked personal digital assistants), a computer (e.g., desktop or laptop), a modem, a network adapter, a network interface card (NIC), etc.).

The device 1000 comprises a memory 1016 and a processing entity 1020 (e.g., a microcontroller) that is coupled to the memory 1020. The processing entity 1020 has the ability to execute computer-readable instructions stored in the memory 1016 which, upon execution, result in the device 1000 implementing a desired process or application. In a non-limiting example, the application is a software application, such as a telephony or banking application, to give but two non-limiting examples.

The memory 1016 includes a memory element 1018 that stores an identifier $I_D$ of the device 1000. Depending on the type of device, the identifier may be configured differently.

For example, in the case where the device 1000 takes the form of an RFID tag, the identifier $I_D$ may be an identifier specifically used in RFID tags and may encode information such as, without limitation, a serial number, a universal product code (UPC), a vehicle registration number (VIN), an account number and a customized identifier.

In the case where the device 1000 takes the form of a communication device that is a mobile telephone, the identifier $I_D$ may be an electronic serial number of the mobile telephone.

In the case where the device 1000 takes the form of a network adapter or NIC, the identifier $I_D$ may be a manufacturer-assigned identifier associated with the communication device. A non-limiting example of a suitable identifier is a Media Access Control address (MAC address), Ethernet Hardware Address (EHA), hardware address, adapter address or physical address, which can be assigned to network adapter or NIC by the manufacturer for identification and can encode a registered identification number of the manufacturer.

In order to gain access to the resource, the device 1000 identifies itself to the network entity 1002 at certain instants hereinafter referred to as "identification occasions". Depending on the application at hand, the identification occasions can arise under control of the device 1000 (i.e., autonomously), under control of the network entity 1002 (e.g., in response to receipt of a request issued by the network entity 1002) or under control of a user (not shown) of the device 1000. For example, in the case of an application involving control of access to real property, an identification occasion may arise whenever the device 1000 is queried by an external reader, which may occur when the device 1000 is sensed by the reader to be within the vicinity thereof. In the case of an application involving control of access to online property, the device 1000 may autonomously identify itself to a remote modem on a regular or irregular basis (e.g., in the context of keeping a session alive). In the case of an application involving control of financial property, an identification occasion may arise at the discretion of the user of the device 1000, e.g., when deciding to make a purchase. In such a case, the device 1000 may comprise an interface with the user that senses user input and can detect or decode when a transaction is taking place or is about to take place.

In accordance with non-limiting embodiments of the present invention, when identifying itself, the device 1000 releases a "signature". Over the course of time, it is assumed that the device 1000 will identify itself to the network entity on at least two identification occasions, which will result in the release of a "signature" each time. As will be described in greater detail herein below, the signatures released on different identification occasions will be different, but all encode the same identifier $I_D$ of the device 1000. Changes to the signature can be effected by the processing entity 1020 which interacts with the memory 1016.

Figure 1:
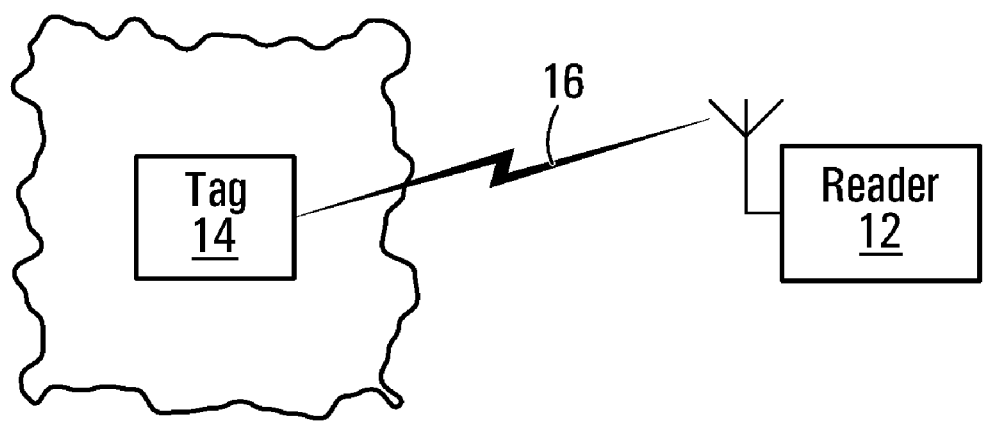
FIG. 1 is a block diagram of a system comprising a reader and a tag, in accordance with a non-limiting embodiment of the present invention.

To take the specific non-limiting example embodiment of an RFID environment, reference is now made to FIG. 1, where the interrogation portion 1010 of the network entity 1002 is implemented as a reader 12 and where the device 1000 is implemented as a contactlessly readable tag 14, a non-limiting example of which is an RFID tag. Communication between the reader 12 and the tag 14 occurs over a contact-less medium 16. In a specific non-limiting embodiment, the contact-less medium 16 is a wireless medium that may include a spectrum of radio frequencies. As described earlier, the tag 14 could be affixed to or integrated with: an item for sale, transported merchandise, a person's clothing, an animal (including livestock), a piece of equipment (including communications equipment such as wireless communications equipment), a vehicle, an access card and a credit card, to name jut a few non-limiting examples. For its part, the reader 12 can be fixed or mobile. In the fixed scenario, the reader 12 could be located at any desired position within a building, vehicle, warehouse, campus, etc. In the mobile scenario, the reader 12 could be implemented in a handheld or portable unit, for example.

Figure 2:
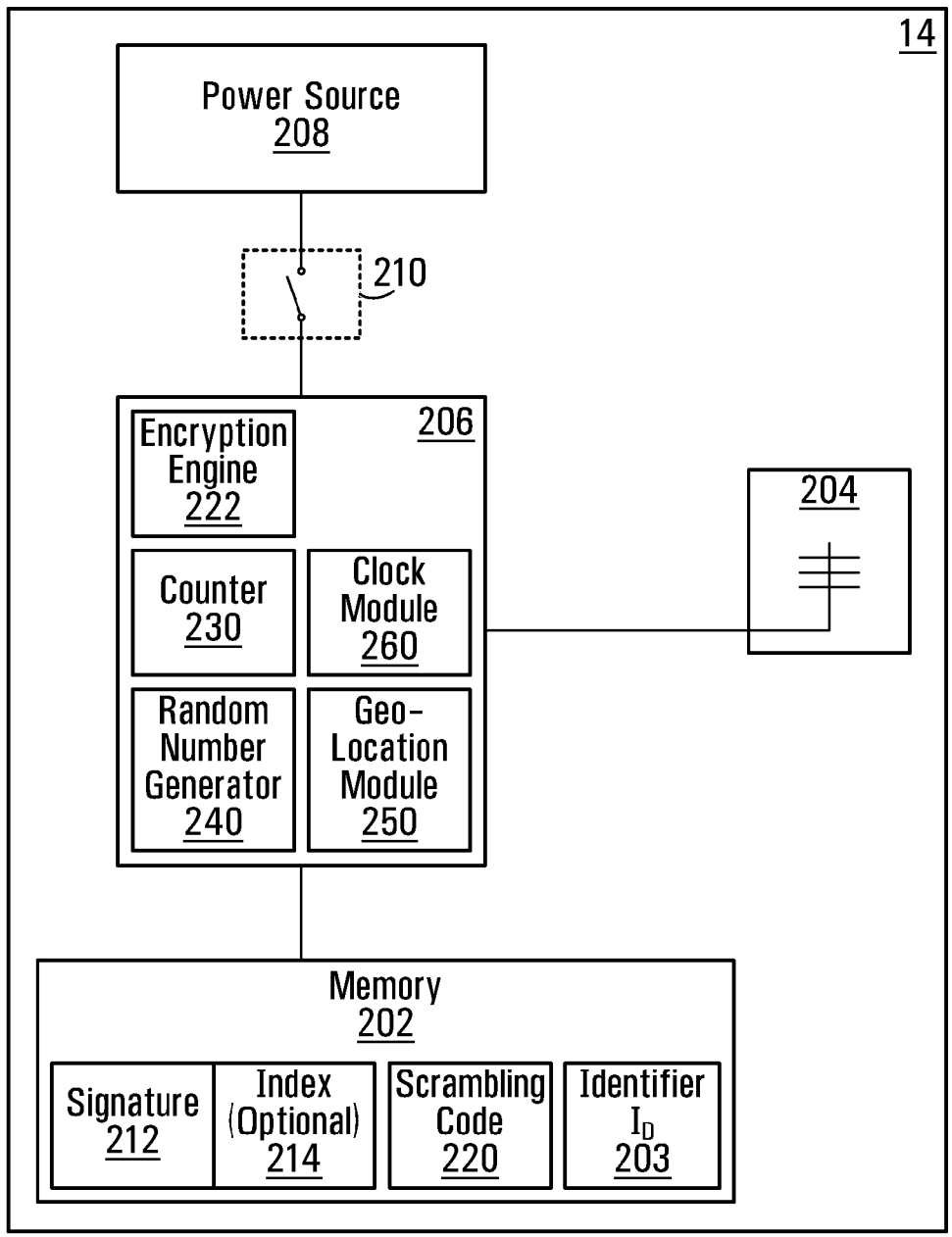
FIG. 2 is a block diagram showing details of the tag, in accordance with a non-limiting embodiment of the present invention.

FIG. 2 shows details of the tag 14, in accordance with a specific non-limiting embodiment of the present invention. The tag 14 comprises a memory 202 (which can be a possible implementation of the memory 1016), transmit/receive circuitry 204 (including an antenna), a controller 206 and a power source 208.

The memory 202 includes a memory element 203 (which can be a possible implementation of the memory element 1018) that stores the identifier $I_D$. In addition, the memory 202 stores a current signature 212. In addition, the memory 202 may store a program for execution by the controller 206, including computer-readable program code for causing the controller 206 to execute various steps and achieve wide-ranging functionality. In a non-limiting embodiment, the current signature 212 can take the form of a bit pattern having a certain number of bits. In accordance with an embodiment of the present invention, the bit pattern exhibited by the current signature 212 is dynamic, that is to say the current signature 212 changes over time.

The controller 206 executes various functions that allow communication to take place via the transmit/receive circuitry 204 between the tag 14 and an external reader such as the reader 12. In what follows, communications will hereinafter be referred to as occurring with the reader 12 although it will be appreciated that the tag 14 may communicate similarly with other external readers that it encounters.

As part of its functionality, the controller 206 is operative to retrieve the current signature 212 from the memory 202 and to release the current signature 212 via the transmit/receive circuitry 204. Alternatively, depending on the computational capabilities of the controller 206, the controller 206 can be operative to compute the current signature 212 on demand and to release via the transmit/receive circuitry 204 the current signature 212 so computed.

It is recalled that in this embodiment, the current signature 212 is dynamic. Accordingly, the controller 206 is operative to communicate with the memory 202 in order to change the bit pattern of the current signature 212 stored in the memory 202. This can be achieved by executing diverse functionality that will be described in greater detail later on, and which may include implementing functional elements such as an encryption engine 222, a counter 230, a pseudo-random number generator 240, a geo-location module 250 and a clock module 260, among others.

The configuration of the power source 208 and its inter-relationship with the controller 206 depend on whether the tag 14 is categorized as "passive", "active" or somewhere in between. Specifically, the tag 14 may be designed as "passive", whereby transmissions of the current signature 212 via the transmit/receive circuitry 204 are effected in response to detection of a burst of energy via the transmit/receive circuitry 204, such burst of energy typically coming from the reader 12 issuing a "read request". In this case, the controller 206 only needs to be powered during the short time period following the detection of the burst. In fact, the burst itself can charge the power source 208 for a brief period, enough to allow the controller 206 to cause transmission of the current signature 212 via the transmit/receive circuitry 204 in response to the read request. The current signature 212 may be extracted from the memory 202 or it may be generated on demand, upon receipt of the read request.

Alternatively, in some embodiments of an "active" tag, transmissions of the current signature 212 via the transmit/receive circuitry 204 are similarly effected in response to detection of a read request via the transmit/receive circuitry 204. In this case, the availability of the power source 208 allows the controller 206 to transmit the current signature 212 at a longer range than for passive devices. Certain active tags also have the capability to switch into a passive mode of operation upon depletion of the power source 208. In other embodiments of an active tag, transmissions of the current signature 212 are effected via the transmit/receive circuitry 204 at instances or intervals that are controlled by the controller 206. This can be referred to as autonomous (or unsolicited) issuance of the current signature 212. To this end, the controller 206 needs to be continuously powered from the power source 208.

Active and passive tags may have other features that will be known to those of skill in the art.

In still other cases, the power source 208 (either continually storing a charge or accumulating a sensed charge) can be connected to the controller 206 via a switch 210, which is optional. The switch 210 can be toggled between a first state during which an electrical connection is established between the power source 208 and the controller 206, and a second state during which this electrical connection is broken. The switch 210 is biased in the second state, and can be placed into the first state. Toggling into the first state can be achieved by a burst of energy that is sensed at a sensor (not shown) or by use of an activation element. In various non-limiting embodiments, the activation element may be a touch-sensitive pad on a surface of the tag 14, or a mechanical component (e.g., a button). Placing the switch 210 into the first state may also trigger the controller 260 to change the current signature 212 in the memory 202.

Figure 3:
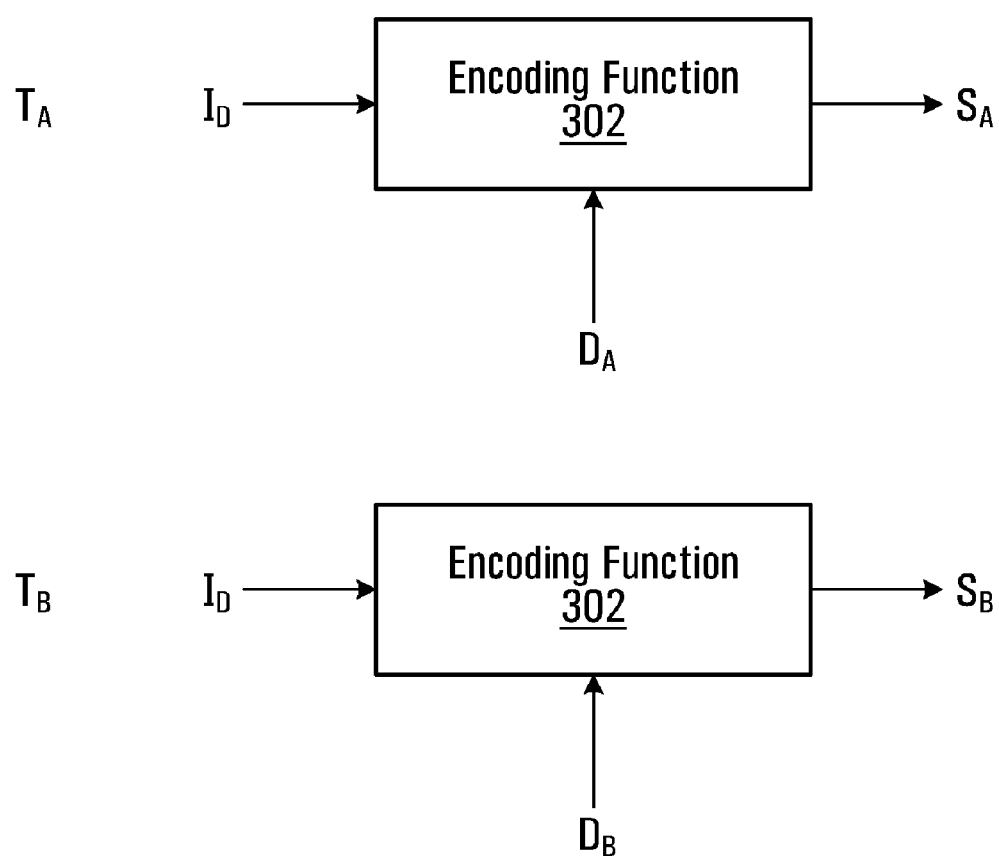
FIG. 3 illustrates a decoding function implemented by a controller in the tag, for generation of a signature at two points in time.

With reference now to FIG. 3, there is shown conceptually how the current signature 212 stored in the memory 202 may change over time. Specifically, different versions of the current signature 212 (denoted $S_A$ and $S_B$) are generated by an encoding function 302 implemented by the controller 206. For notational convenience, the current signature 212 is used to denote which of the two signatures $S_A$, $S_B$ is currently stored in the memory 202. The encoding function 302 generates the signatures $S_A$ and $S_B$ by encoding the aforementioned identifier $I_D$ (which, as will be recalled, is the identifier of the device 1000, to which is affixed the tag 14 in this example embodiment) with a respective "additional data set" (denoted $D_A$ and $D_B$) at respective time instants (denoted $T_A$ and $T_B$). Thus, at $T_A$, the signature $S_A$ is generated by encoding the identifier $I_D$ with the additional data set $D_A$, whereas at $T_B$, the signature $S_B$ is generated by encoding the identifier $I_D$ with the additional data set $D_B$. While in this example, two time instants are shown and described, this is solely for simplicity, and it should be understood that in actuality, the current signature 212 may change many times.

In accordance with a non-limiting embodiment of the present invention, the additional data sets $D_A$ and $D_B$ are different, which makes both signatures $S_A$, $S_B$ different. In fact, the two signatures $S_A$, $S_B$ will appear scrambled relative to one another due to use of the encryption engine 222 within the encoding function 302. More specifically, the signatures $S_A$ and $S_B$ can be generated from the additional data sets $D_A$ and $D_B$ in a variety of ways, two of which will be described herein below.

First Approach

Figure 4A:
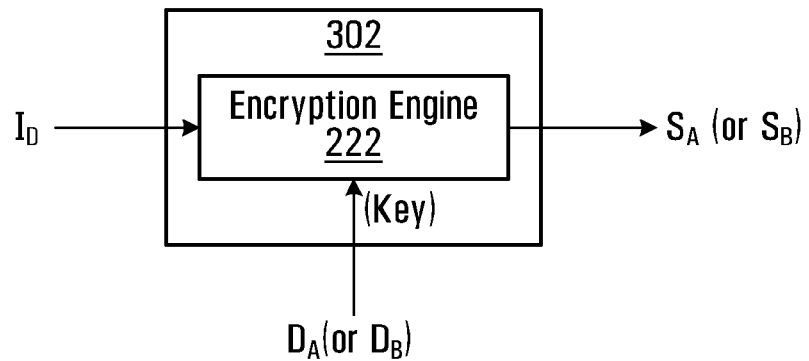
FIGS. 4A and 4B depict two possible functional architectures for generation of a signature.

In a first approach, described with reference to FIG. 4A, the identifier $I_D$ is encrypted by the encryption engine 222 with a dynamic key—represented by the additional data sets $D_A$, $D_B$ themselves, resulting in the two signatures $S_A$, $S_B$. The two signatures $S_A$, $S_B$ will be different because the additional data sets $D_A$, $D_B$ are different. In fact, they will appear scrambled relative to one another when observed by someone who has not applied a decryption process using a counterpart to the keys used by the encryption engine 222.

It will be noted that in order to make the first approach practical, the reader 12 needs to have knowledge of which key (i.e., which of the additional data sets $D_A$, $D_B$) was used for encryption of a received one of the signatures $S_A$, $S_B$, in order to effect proper decryption and recover the identifier $I_D$. For this purpose, in order to assist the reader 12 in identifying the correct key to be used for decryption, and with reference again to FIG. 2, the current signature 212 may be accompanied by an index 214 also stored in the memory 202. The index 214 may point the reader 12 to the correct key to be used. The reader 12 may have access to a key database (not shown) for this purpose.

For example, consider the case where the keys (in this case, the additional data sets $D_A$, $D_B$) correspond to outputs of the pseudo-random number generator 240 having a seed known a priori to the tag 14 and to the reader 12. Here, at $T_A$, the index 214 may indicate the sequential position in the output of the pseudo-random number generator 240 that corresponds to the additional data set $D_A$, while at $T_B$, the index 214 may indicate the sequential position in the output of the pseudo-random number generator 240 that corresponds to the additional data set $D_B$. The reader 12 can then easily find the value occupying the correct sequential position in the output of an identical local pseudo-random number generator and effect successful decryption of the received signature ($S_A$ or $S_B$).

Alternatively, the keys (in this case, the additional data sets $D_A$, $D_B$) are provided by the reader 12. This can be done where the reader 12 (or an entity associated therewith) decides that a change in the current signature 212 is required. As a variant, the reader 12 may issue a trigger which, when received by the controller 206, causes the controller 206 to effect a change in the current signature 212. In such cases, changes to the key (and thus to the current signature 212) are effected by the controller 206 in response to triggers received from the reader 12.

Second Approach

Figure 4B:
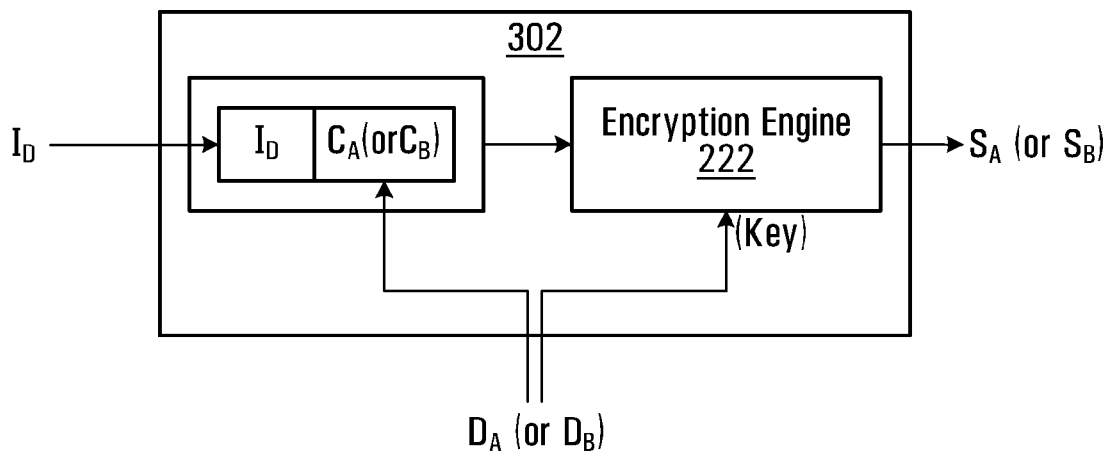

For other applications, the approach of FIG. 4B may be useful. Here, the identifier $I_D$ is augmented with differing scrambling codes (denoted $C_A$ and $C_B$), and then encrypted by the encryption engine 222 with a common key (denoted K), thus producing the two signatures $S_A$, $S_B$. The "additional data set" $D_A$ used for encryption at $T_A$ is therefore composed of the key K and the scrambling code $C_A$, while the "additional data set" $D_B$ used for encryption at $T_B$ is composed of the same key K and the scrambling code $C_B$. The encryption process can be designed so that small differences (in terms of the number of bits where there is a difference) between the scrambling codes $C_A$ and $C_B$ will cause large differences (in terms of the number of bits where there is a difference) in the resultant signatures $S_A$ and $S_B$. Thus, the scrambling codes $C_A$, $C_B$ have the effect of scrambling (i.e., randomizing) the resultant signatures $S_A$, $S_B$.

The controller 206 is responsible for determining which scrambling code is to be used to generate a particular signature at a particular time instant. The current version of the scrambling code can be stored in the memory 202 and is denoted 220 for convenience. It will be appreciated based on the above description that the scrambling code $C_A$ corresponds to the current scrambling code 220 at $T_A$ and that the scrambling code $C_B$ corresponds to the current scrambling code 220 at $T_B$.

Continuing with the second approach, several classes of embodiments are contemplated for changing the current scrambling code 220. In a first class of embodiments relevant to the approach of FIG. 4B, the current scrambling code 220 is changed in a way that can be predicted by the reader 12, that is to say, where the reader 12 (or an entity associated therewith) has knowledge of how each successive scrambling code is generated.

For example, the current scrambling code 220 can be changed each time (or, generally, each $N^{th}$ time where $N \geq 1$) that the controller 206 receives a read request or releases the current signature 212 in response to a read request. This can ensure that the current signature 212 is different each $N^{th}$ time that the controller 206 receives a read request. Alternatively, the current scrambling code 220 is changed every the current scrambling code 220 can be changed every set period of time (ex. every N seconds, minutes, hours, days, etc.). The variations in the current scrambling code 220 may governed in a variety of ways that are predictable to the reader 12. For example, the controller 206 may implement a counter 230, whose output is incremented (by a step size that can equal unity or can be negative, for example) after each $N^{th}$ time that the controller 206 responds to a read request received from a nearby reader (or each N seconds, etc.). If the current scrambling code 220 is set to correspond to the current output of the counter 230, then the scrambling codes $C_A$, $C_B$ used to generate the two signatures $S_A$, $S_B$ will differ by the step size.

Alternatively, the controller 206 may implement the aforesaid pseudo-random number generator 240, which produces an output that depends on one or more previous values of the output and on a seed. If the current scrambling code 220 is set to correspond to the current output of the pseudo-random number generator 240, then the scrambling codes $C_A$, $C_B$ used to generate the two signatures $S_A$, $S_B$ will differ in accordance with the characteristics of the pseudo-random number generator 240.

Other variants will become apparent to those of skill in the art without departing from the scope of the present invention.

In a second class of embodiments relevant to the approach of FIG. 4B, the additional data sets $D_A$, $D_B$ are not only predicted by the reader 12 but are actually controlled by the reader 12. This can be useful where the reader 12 (or an entity associated therewith) decides that a change in the current signature 212 is required. Alternatively, and recognizing that the key K is common to both of the additional data sets $D_A$, $D_B$, the reader 12 could supply the unique portions of the additional data sets $D_A$, $D_B$, namely the scrambling codes $C_A$, $C_B$.

As a variant, the reader 12 may simply issue a trigger which, when received by the controller 206, causes the controller 206 to effect a change in the current signature 212. In such cases, changes to the current signature 212 are effected by the controller 206 in response to triggers received from the reader 12.

In a third class of embodiments relevant to the approach of FIG. 4B, it may be desired to change the signatures $S_A$, $S_B$ in a stochastic way, that is to say, without the need to follow an underlying pattern that could be predicted by the reader 12.

For example, the controller 206 may implement the aforementioned geo-location module 250, which is configured to output a current spatial position of the tag 14 or of an item, person, vehicle, etc., to which it is affixed. If the current scrambling code 220 is set to correspond to the current output of the geo-location module 250, then the scrambling codes $C_A$, $C_B$ used to generate the two signatures $S_A$, $S_B$ will differ in a stochastic fashion.

Alternatively, the controller 206 may implement a clock module 260, which is configured to determine a current time. If the current scrambling code 220 is set to correspond to a value measured by the clock module 260 (e.g., number of milliseconds elapsed since midnight of the day before), then the scrambling codes $C_A$, $C_B$ used to generate the two signatures $S_A$, $S_B$ will differ in a stochastic fashion.

Although the foregoing description has focused on a non-limiting example wherein the device 1000 bore the tag 14, wherein the interrogation portion 1010 of the network entity 1002 consisted of the reader 12 and the communication pathway 1014 was a wireless medium, it should be apparent to persons of skill in the art that there exist many other embodiments of the present invention with application to a wide variety of other scenarios, as has been mentioned earlier.

In view of the above, it should be thus be appreciated that a common identifier of the device 1000 is encoded within a plurality of signatures that vary over time for the same device 1000. This identifier can be extracted by the network entity 1002 (either the interrogation portion 1010 or the processing portion 1012, as applicable) by utilizing the appropriate key for decryption. This allows the network entity 1002 to perform a variety of functions, including but not limited to validation of the identifier based on the signature and/or the scrambling code (hereinafter "scenario (I)") and/or an action related to identification, based on the identifier (hereinafter, "scenario (II)"). Both of these scenarios, which are not mutually exclusive, are now described in some detail, again in the specific non-limiting example embodiment of an RFID environment.

In scenario (I), a dynamic scrambling code is used in the generation of a signature that continually encodes the same identifier, and it is of interest to recover the current scrambling code to detect a potential instance of tag cloning. Accordingly, with reference to FIG. 6A, there is shown a system that is similar to the system of FIG. 1. In addition, the system of FIG. 6A comprises a processing entity 610 that implements a validation operation, as will be described herein below. In various embodiments, the processing entity 610 referred to above may be connected to the reader 12, or it may be a remote entity. Such a remote entity may be reachable over a network, or it may be integrated with the reader 12. Thus, the processing entity 610 may be part of the network entity 1002 or, more specifically, part of the processing portion 1012.

Figure 6A:
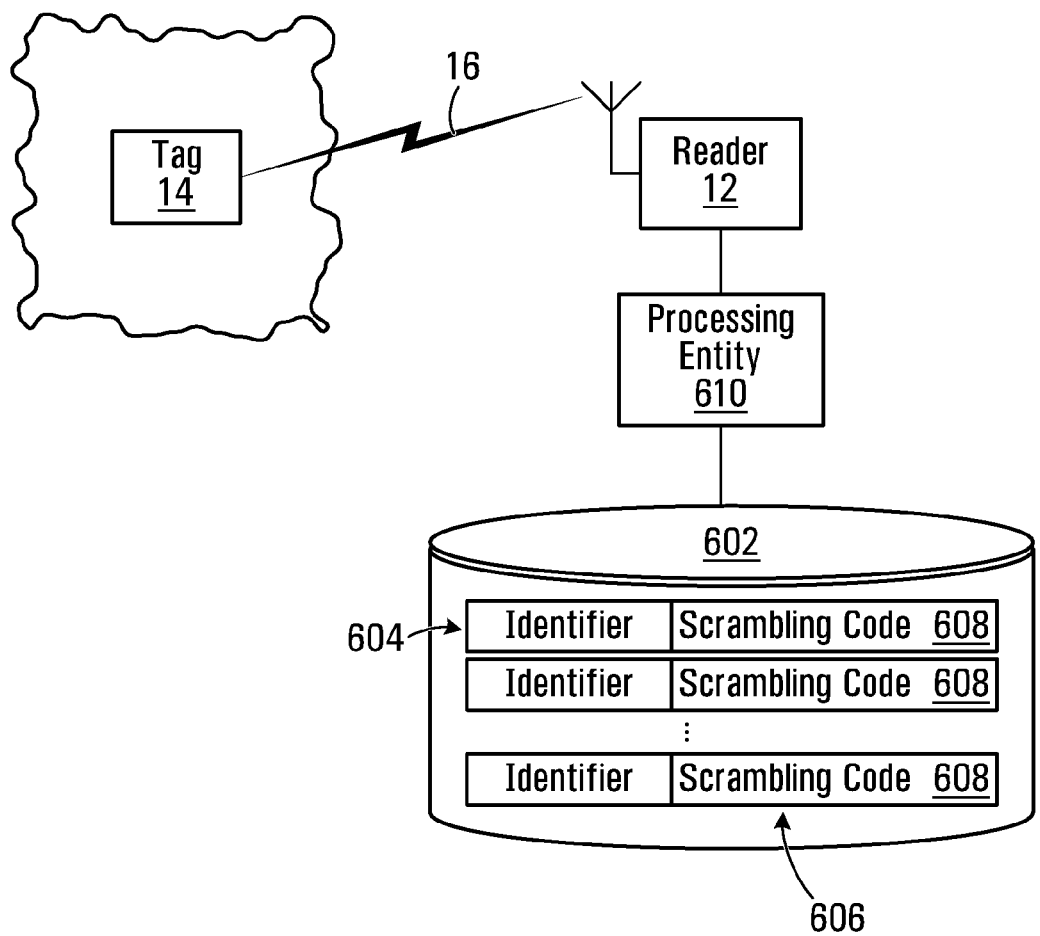
FIG. 6A shows application of a non-limiting embodiment of the present invention in a validation context.

The system of FIG. 6A also includes a storage entity, such as a database 602, that is accessible to the processing entity 610 and stores a plurality of records 604, each associated with a respective identifier. For the purposes of the present example, one can consider that each identifier for which there exists a record in the database 602 is indicative of a privilege to access certain property or make certain transactions, although other scenarios are possible without departing from the scope of the present invention.

In accordance with one embodiment of the present invention, each of the records 604 also comprises a field 606 indicative of zero or more scrambling codes 608 that were encoded in signatures which were previously received and which encoded the respective identifier for that record. Thus, receipt of a particular signature that encodes the identifier in a given one of the records 604 as well as one of the scrambling code(s) 608 stored in the corresponding field 606 will indicate that the particular signature has been previously received and therefore its instant receipt may be indicative that a cloning attempt has been made.

Figure 7A:
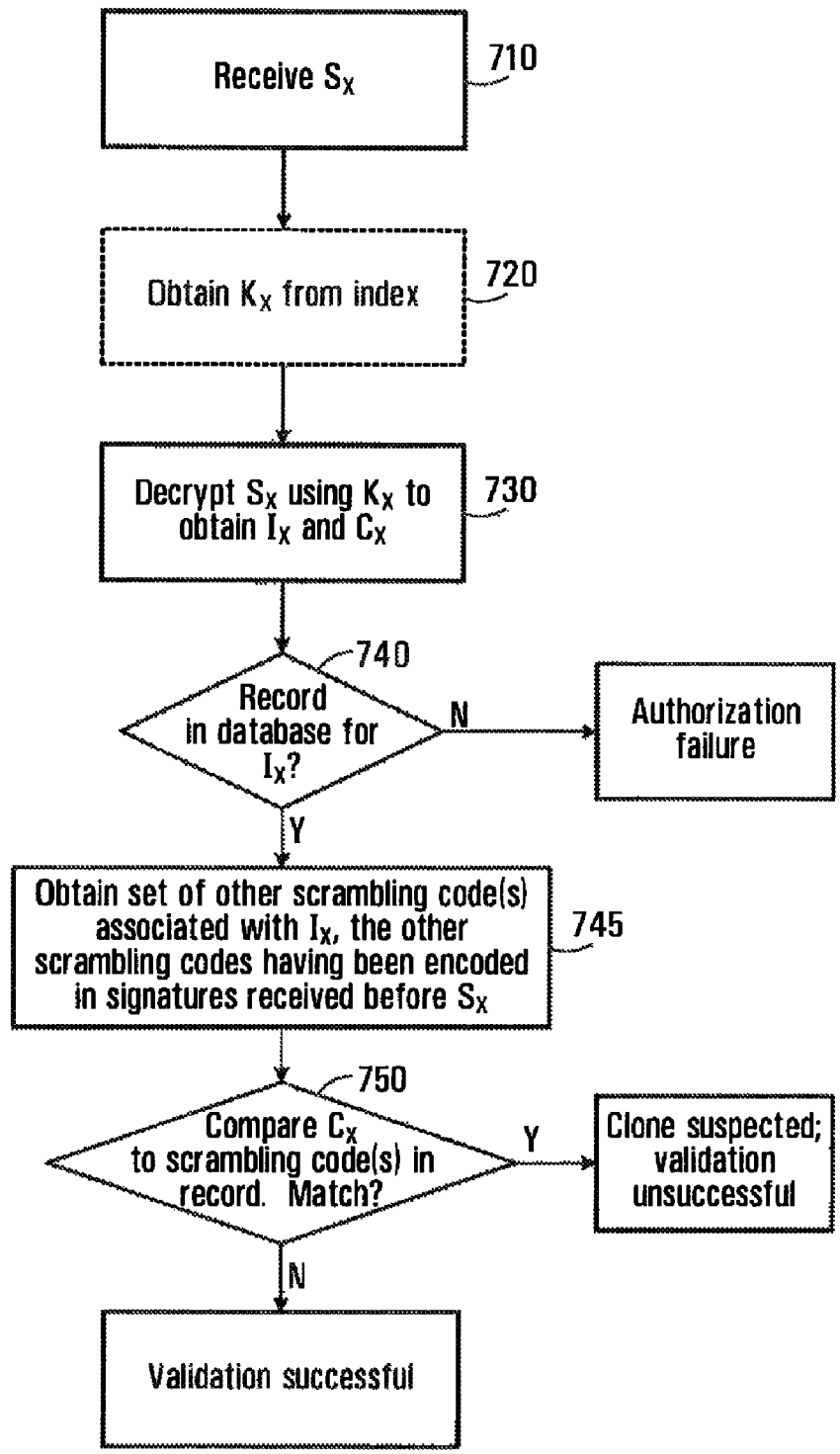
FIG. 7A is a flowchart showing operation of a processing entity of FIG. 6 when considering tags whose signatures encode a variable scrambling code and that are encrypted using a common key that is known to the reader or can be determined from an index supplied with the signature.

More specifically, with reference to the flowchart in FIG. 7A, consider what happens following step 710 when a signature $S_X$ is received at a particular time instant by the reader 12. At the time of receipt, whether the signature $S_X$ encodes any particular identifier or scrambling code is unknown to the reader 12. At step 730, an attempt to decrypt the signature $S_X$ is made by the processing entity 610 using a decryption key $K_X$. The decryption key $K_X$ may be known in advance to the processing entity 610. Alternatively, as shown in step 720, the signature $S_X$ may be accompanied by an index that allows the processing entity 610 to determine the appropriate decryption key $K_X$. The result of the decryption attempt at step 730 is a candidate identifier $I_X$ and a candidate scrambling code, denoted $C_X$.

At step 740, the processing entity 610 consults the database 602 based on the candidate identifier $I_X$ in an attempt to identify a corresponding record. If there is such a record, the processing entity extracts therefrom, at step 745, a list of scrambling code(s) that have been received in the past in association with the candidate identifier $I_X$. These scrambling code(s) were encoded in signatures which were previously received and which encoded the identifier $I_X$. For the purposes of the present example, it is useful to assume that such a record exists (i.e., the "YES" branch is taken out of step 740), but if there is no such record, this may indicate that there is a high-level failure requiring further action. At step 750, the processing entity 610 compares the candidate scrambling code $C_X$ to the scrambling code(s) 608 in the field 606 of the record identified at step 740 and corresponding to identifier $I_X$.

If there is a match, this indicates that the scrambling code $C_X$ has been used in the past in association with the identifier $I_X$. Under certain conditions, this may lead the processing entity 610 to conclude that the validation operation was unsuccessful.

For example, if the signature $S_X$ was expected to change at least as often as every time that the tag on which it is stored was read, then the fact that the scrambling code $C_X$ matches one of the scrambling code(s) 608 stored in the field 606 of the record corresponding to identifier $I_X$ may lead the processing entity 610 to conclude that the validation operation was unsuccessful. Alternatively, if the signature $S_X$ was expected to change every $N^{th}$ time that the tag on which it is stored was read, then the processing entity 610 may look at how many of the scrambling code(s) 608 stored in the field 606 of the record corresponding to identifier $I_X$ correspond to the scrambling code $C_X$, and if this number is greater than or equal to N, this may lead the processing entity 610 to conclude that the validation operation was unsuccessful. Alternatively still, if the signature $S_X$ was expected to change at least as often as every N seconds etc., then the processing entity 610 may look at how long ago it has been since a matching one of the scrambling code(s) 608 was first stored in the field 606 of the record corresponding to identifier $I_X$, and if this time interval is greater than or equal to a pre-determined number of seconds, minutes, hours, days, etc., this may lead the processing entity 610 to conclude that the validation operation was unsuccessful.

Where a conclusion is reached that the validation operation was unsuccessful, the privilege to access the property or make transactions may be revoked or at least questioned on the basis of suspected tag cloning.

On the other hand, if there is no match between the scrambling code $C_X$ and any of the scrambling code(s) 608 stored in the field 606 of the record corresponding to identifier $I_X$, this may lead the processing entity 610 to conclude that the validation operation was potentially successful. In such a case, the default privilege to access the property or make transactions may be granted (or at least not revoked on the basis of suspected tag cloning).

In accordance with an alternative embodiment of the present invention, the field 606 in the record associated with each particular identifier may be indicative of an "expected" scrambling code, i.e., the scrambling code that should (under valid circumstances) be encoded in a signature received from a tag that encodes the particular identifier. Alternatively, the field 606 in the record associated with each particular identifier may be indicative of an "expected" signature, i.e., the signature that should (under valid circumstances) be received from a tag that encodes the particular identifier. Thus, upon receipt of the signature $S_X$, if it is found to correspond to the expected signature (or if the scrambling code $C_X$ is found to correspond to the expected scrambling code), this may lead the processing entity 610 to conclude that the validation operation was potentially successful. On the other hand, if there is no match between the signature $S_X$ and the expected signature stored in the database 602 (or between the scrambling code $C_X$ and the expected scrambling code), this may lead the processing entity 610 to conclude that the validation operation was unsuccessful.

It should be appreciated that in the above alternative embodiments, the processing entity 610 may obtain knowledge of the expected scrambling code or the expected signature by implementing plural pseudo-random number generators for each of the identifiers, analogous to the pseudo-random number generator 240 implemented by the controller 206 in a given tag 14, which produces an output that depends on one or more previous values of the output and on a seed. Thus, the next output of the pseudo-random number generator implemented by the processing entity 610 for a given identifier allows the processing entity 610 to predict the scrambling code (or the signature) that should be received from a tag legitimately encoding the given identifier. In another embodiment, the processing entity 610 may know what is the expected scrambling code/signature because it has instructed the reader 12 to cause this expected scrambling code/signature to be stored in the memory of the tag.

In accordance with an alternative embodiment of the present invention, the database 602 simply comprises a running list of all signatures that have been received in the past. Thus, upon receipt of the signature $S_X$, if it is found to correspond to one of the signatures on the list, this may lead the processing entity 610 to conclude that the validation operation was unsuccessful. On the other hand, if there is no match between the signature $S_X$ and any of the signatures stored in the database 602, this may lead the processing entity 610 to conclude that the validation operation was potentially successful (or at least not unsuccessful).

It should also be appreciated that having obtained the identifier $I_X$, the processing entity 610 may also perform an action related to identification of an item, vehicle, person, etc., associated with the particular tag that encoded the identifier $I_X$.

In a first example of an action related to identification, the processing entity 610 may simply note the fact that the item, vehicle, person, etc. (bearing the identifier $I_X$) was encountered in a vicinity of the reader 12. This information may be stored in a database (not shown) or sent as a message, for example. In an inventory management scenario, the processing entity 610 may consult an inventory list and "check off" the inventory item as having been located, or may signal that the presence of a spurious inventory item (i.e., one that is not on the inventory list) has been detected.

In another example of an action related to identification, the processing entity 610 may consult another database (not shown) in order to ascertain whether the identifier is on a list of identifiers associated with individuals/objects permitted to access, or prohibited from accessing, certain property. Examples of property include, without limitation: computing equipment, a computer network, a building, a portion of a building, an entrance, an exit and a vehicle.

In another example of an action related to identification, the processing entity 610 may consult another database (not shown) in order to ascertain whether the identifier is on a list of identifiers associated with individuals permitted to effect, or prohibited from effecting, a transaction, which could be a financial transaction or a login to controlled online content, for example.

Figure 7B:
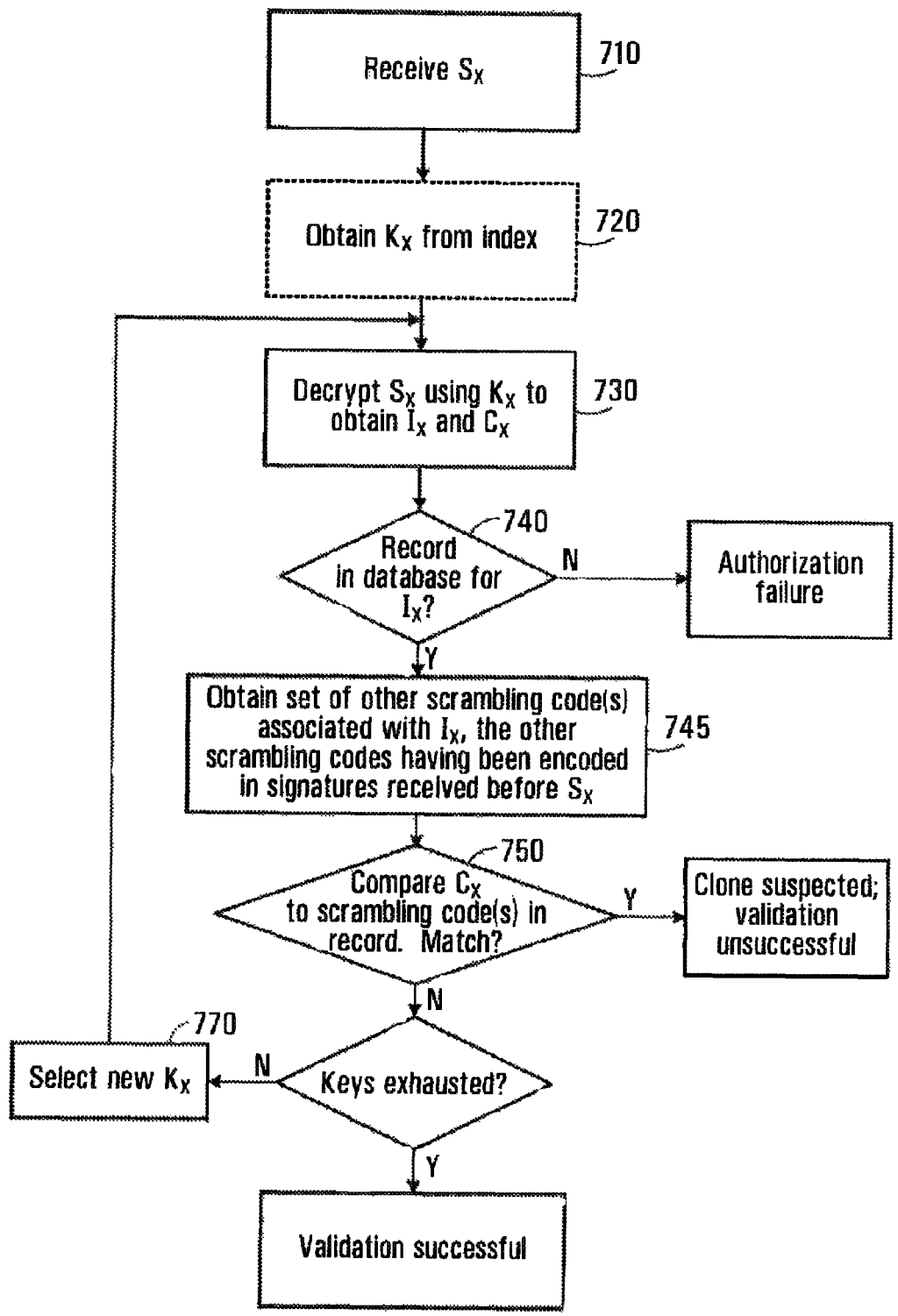
FIG. 7B is a flowchart similar to that of FIG. 7A, but where the common key is unknown to the reader.

FIG. 7B shows a variant where multiple keys are possible but no index (or one that does not permit identification of the appropriate decryption key) is provided along with the signature $S_X$. Specifically, taking the "NO" branch after step 750 does not conclude the validation operation. Rather, the validation operation goes through step 770 where a next key is selected and then the validation operation returns to step 730, whereby steps 730 through 770 are re-executed until the earlier occurrence of (i) taking the "YES" branch at step 750 and (ii) exhaustion of all keys, which can result in the equivalent of taking the "NO" branch out of 740 (i.e., this may indicate that there is a high-level failure requiring further action).

It should be appreciated that in the above embodiments, encryption and decryption can be effected using various techniques known in the art, including encryption using a symmetric key, an asymmetric key pair, a public/private key pair, etc., as well as in accordance with a variety of algorithms and protocols For example, RSA and ECC are suitable examples of asymmetric encryption algorithms, while AES, DES, and Blowfish are suitable examples of symmetric algorithms. Still other possibilities exist and are within the scope of the present invention.

Figure 6B:
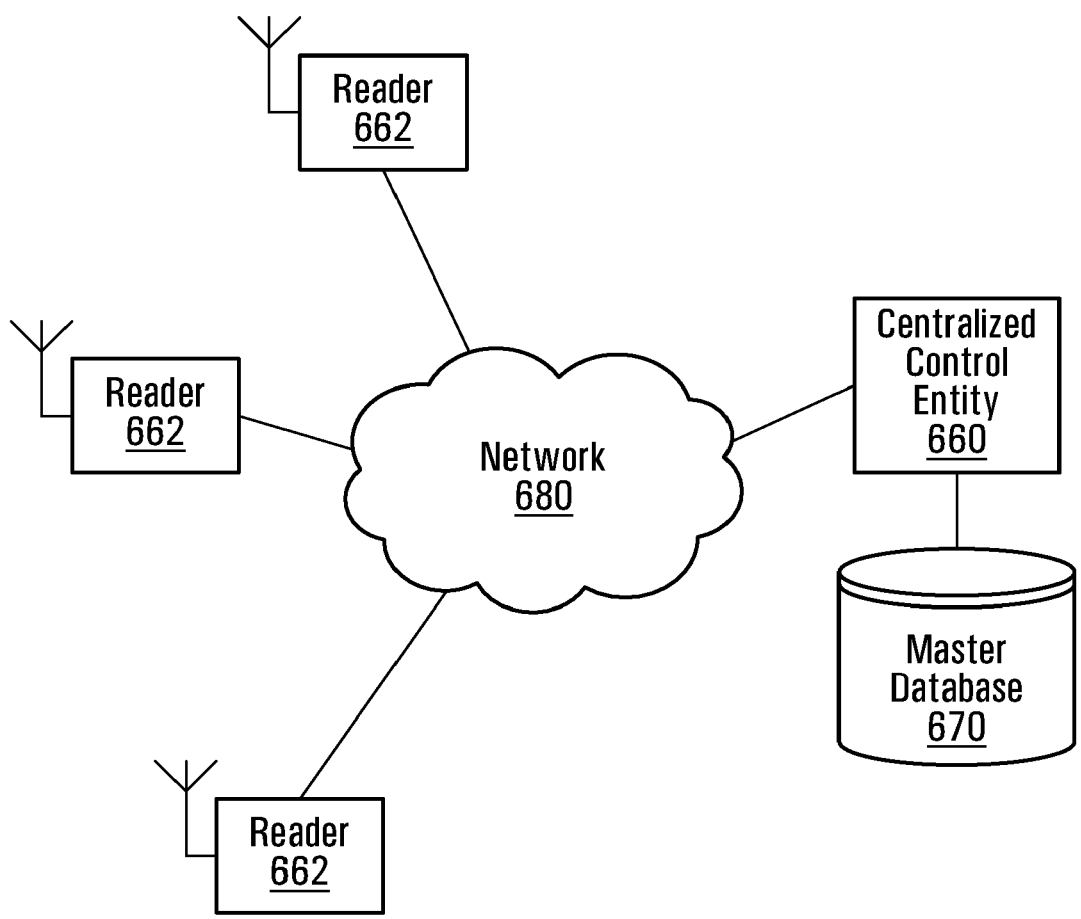
FIG. 6B is a block diagram of a multi-reader architecture, in accordance with a non-limiting embodiment of the present invention.

In the above example with reference to FIGS. 6A, 7A and 7B, although a single reader was described and illustrated, it should be appreciated that it is within the scope of the present invention to provide a multi-reader architecture, as shown in FIG. 6B. A plurality of readers 662 are connected to each other and to a centralized control entity 660 by a network 680, which can be a public packet-switched network, a VLAN, a set of point-to-point links, etc. In such a case, the centralized control entity 660 (e.g., a network controller) can implement the combined functionality of each individual processing entity 610, including decryption and validation. To this end, the centralized control entity 660 maintains a master database 670, which includes the equivalent of a consolidated version of various instances of the database 602 previously described as being associated with the reader 12 in the single-reader scenario.

Thus, decryption and validation can be performed entirely in the centralized control entity 660. Alternatively, certain functionality (such as decryption) can be performed by the readers 662 while other functionality (such as validation) can be performed by the centralized control entity 660. Still alternatively, the processing entities 610 can inter-operate amongst themselves in the absence of the centralized entity 660, thereby to implement decryption on a local basis, and the validation operation in a joint fashion. In such a distributed scenario, the master database 670 can still be used, or the processing entities 610 can communicate with one another to share information in their respective databases 602.

Figure 8:
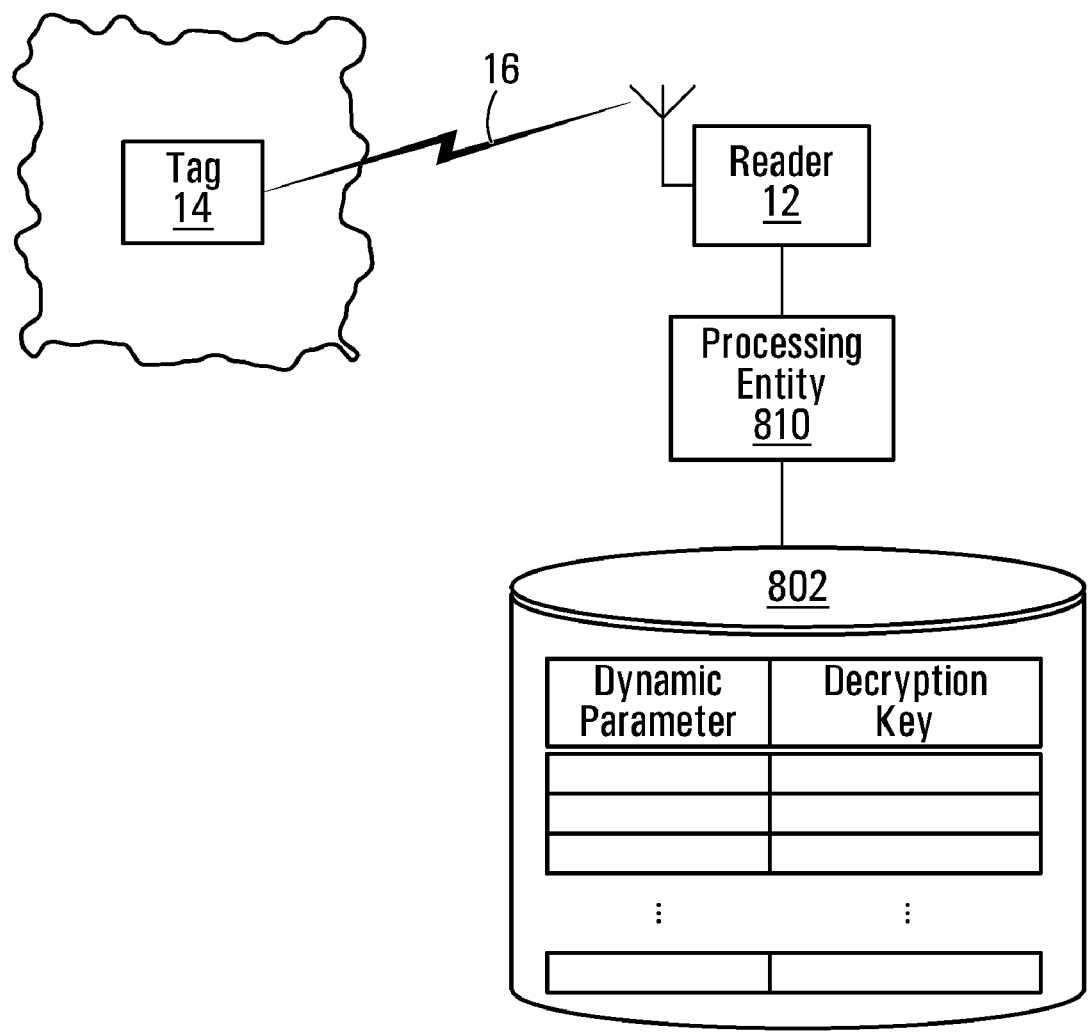
FIG. 8 shows application of a non-limiting embodiment of the present invention in an identification context when considering tags whose signatures are encrypted using a variable key.

In scenario (II), a dynamic key is used in the generation of a signature that encodes a constant identifier, and it is of interest to recover the underlying identifier despite the time-varying key. Accordingly, with reference now to FIG. 8, there is shown a system that is similar to the system of FIG. 1. In addition, the system of FIG. 8 comprises a processing entity 810 that implements an identification operation, as will be described herein below. The processing entity 810 may be connected to the reader 12, or it may be a remote entity. Such a remote entity may be reachable over a network, or it may be integrated with the reader 12. Thus, the processing entity 810 may be part of the network entity 1002 or, more specifically, part of the processing portion 1012. It should be understood that the system in FIG. 8 is being shown separately from the system in FIG. 6; however, it is within the scope of the present invention to combine the functionality of both systems.

Figure 9:
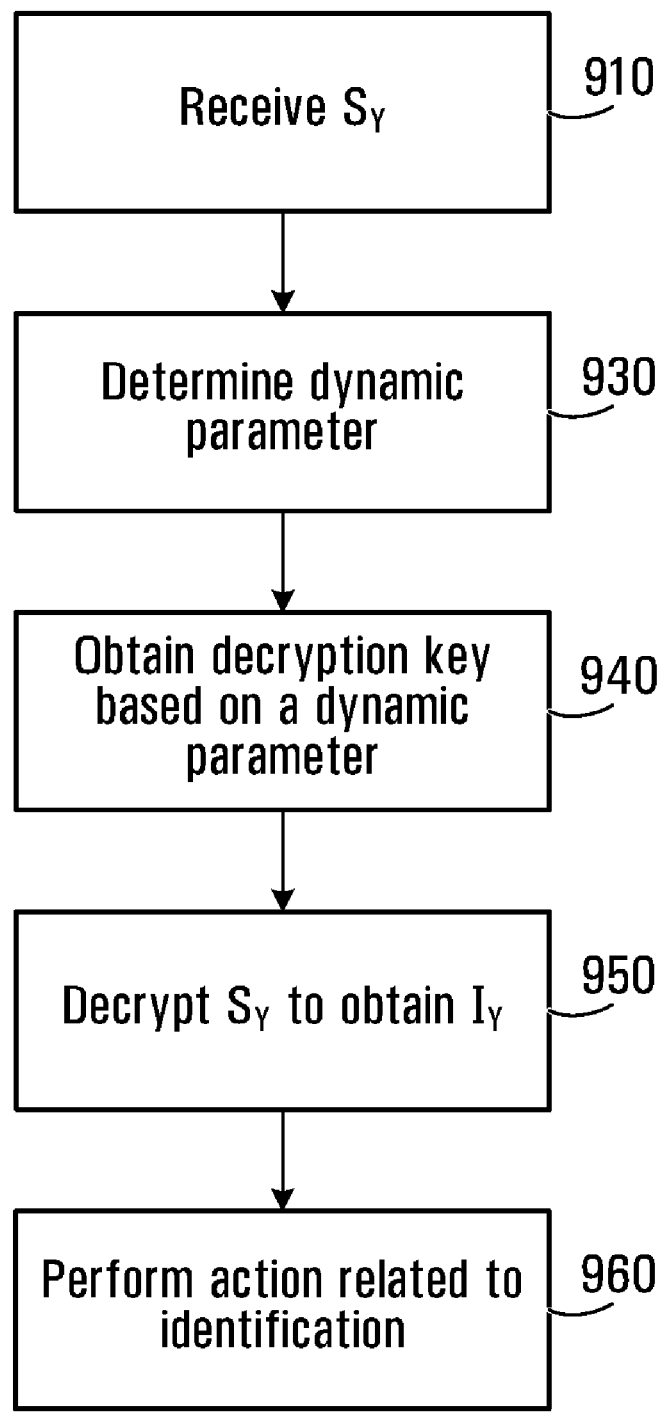
FIG. 9 is a flowchart showing operation of a processing entity of FIG. 8 when considering tags whose signatures are encrypted using a variable key.

With reference to the flowchart in FIG. 9, consider what happens following step 910 when a signature $S_Y$ is received from a particular tag at a particular time instant by the reader 12. The signature $S_Y$ is assumed to have been generated by encrypting an identifier $I_Y$ using an encryption key that varies in a dynamic fashion. To this end, the particular tag may have generated the dynamic encryption key based on, for example:
the output of the aforementioned clock module 260 (e.g., in terms of seconds, minutes or hours of elapsed time since an event known also to the processing entity 810);
the output of the aforementioned geo-location module 250;
an index;
a seed for use by a pseudo-random number generator.

Still other possibilities are within the scope of the present invention. The decryption key can then be determined based on the above quantity. For example, the decryption key could be the above-mentioned output of the clock module or the geo-location module. Alternatively, the encryption key could be the output of a table or a pseudo-random number generator (both known to the processing entity 810) based on the above-mentioned seed, or at a position that corresponds to the above-mentioned index. In the latter case, the index or seed can be supplied along with the signature $S_Y$.

In accordance with the present embodiment, once the signature $S_Y$ is read by the reader 12, the processing entity 810 is expected to determine the appropriate decryption key, denoted $K_Y$. Accordingly, at step 930, the processing entity 810 first determines a dynamic parameter that will allow the decryption key $K_Y$ to be determined. Examples of the dynamic parameter include:
the output of a clock module (which attempts to emulate the aforementioned clock module 260) at the time of receipt of the signature $S_Y$ (e.g., in terms of seconds, minutes or hours of elapsed time since a known event);
the output of a geo-location module (which can be similar to the aforementioned geo-location module 250);
the index or seed provided along with the signature $S_Y$.

Next, at step 940, the processing entity 810 obtains the decryption key $K_Y$ based on the dynamic parameter determined at step 930. For example, where the dynamic parameter corresponds to the output of a clock module or a geo-location module, the decryption key $K_Y$ could be the dynamic parameter itself. Alternatively, where the dynamic parameter is an index or a seed, the decryption key $K_Y$ could be the output of the aforementioned table or pseudo-random number generator known to the processing entity 810, at a position that corresponds to the received index, or using the received seed.

Once the decryption key has been obtained, the signature $S_Y$ is decrypted at step 950 using the decryption key. This leads to extraction of the identifier $I_Y$. It is noted that a scrambling code was not required in this embodiment, although its use is not disallowed.

Having obtained the identifier $I_Y$, the processing entity 810 proceeds to step 960, where it performs an action related to identification of an item, vehicle, person, etc., associated with the particular tag that encoded the identifier $I_Y$.

In a first example of an action related to identification, the processing entity 810 may simply note the fact that the item, vehicle, person, etc. (bearing the identifier $I_Y$) was encountered in a vicinity of the reader 12. This information may be stored in a database (not shown) or sent as a message, for example. In an inventory management scenario, the processing entity 810 may consult an inventory list and "check off" the inventory item as having been located, or may signal that the presence of a spurious inventory item (i.e., one that is not on the inventory list) has been detected.

In another example of an action related to identification, the processing entity 810 may consult another database (not shown) in order to ascertain whether the identifier is on a list of identifiers associated with individuals/objects permitted to access, or prohibited from accessing, certain property. Examples of property include, without limitation: computing equipment, a computer network, a building, a building, a portion of a building, an entrance, an exit and a vehicle.

In yet another example of an action related to identification, the processing entity 810 may consult another database (not shown) in order to ascertain whether the identifier is on a list of identifiers associated with individuals permitted to effect, or prohibited from effecting, a transaction, which could be a financial transaction or a login to controlled online content, for example.

It should be appreciated that the processing entity 810 may also perform an action related to validation of the identifier $I_Y$ in conjunction with the above action related to identification. Specifically, in accordance with one embodiment of the present invention, the processing entity may consult a variant of the aforementioned database 602, where each of the records 604 now includes a field indicative of zero or more signatures which were previously received and which encoded the respective identifier for that record. Thus, receipt of a particular signature that encodes the identifier in a given one of the records 604 as well as one of the signature(s) stored in the corresponding field will indicate that the particular signature has been previously received and therefore its instant receipt may be indicative that a cloning attempt has been made.

In the above example with reference to FIGS. 8 and 9, although a single reader was described and illustrated, it should be appreciated that it is within the scope of the present invention to provide a multi-reader architecture, as in FIG. 6B.

It should also be understood that the foregoing detailed description focused on a non-limiting example wherein the device 1000 bore the tag 14, wherein the interrogation portion 1010 of the network entity 1002 consisted of the reader 12 and the communication pathway 1014 was a wireless medium. However, it should be apparent to persons of skill in the art that there exist many other embodiments of the present invention with application to a wide variety of other scenarios, as has been mentioned earlier.

Also, those skilled in the art will appreciate that in some embodiments, the functionality of any or all of the processing entity 610, the processing entity 810, the reader 12, the readers 662, the network entity 1002 (including the interrogation portion 1010 and the processing portion 1012) and the processing entity 1020 may be implemented using pre-programmed hardware or firmware elements (e.g., application specific integrated circuits (ASICs), electrically erasable programmable read-only memories (EEPROMs), etc.), or other related components. In other embodiments, the functionality of the entity in question may be achieved using a computing apparatus that has access to a code memory (not shown) which stores computer-readable program code for operation of the computing apparatus, in which case the computer-readable program code could be stored on a medium which is fixed, tangible and readable directly by the entity in question (e.g., removable diskette, CD-ROM, ROM, fixed disk, USB drive), or the computer-readable program code could be stored remotely but transmittable to the entity in question via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A method for execution by a processing entity of a reader, the method comprising:
   receiving a first signature from a device over a communication pathway;
   decrypting the first signature with a computing apparatus to obtain a candidate identifier and a candidate scrambling code;
   consulting a storage entity to obtain a set of other scrambling codes associated with the candidate identifier, the other scrambling codes having been encoded in signatures received before the first signature;
   validating the first signature based on a comparison of the candidate scrambling code to the set of other scrambling codes associated with the candidate identifier; and
   updating the set of other scrambling codes associated with the candidate identifier to include the candidate scrambling code.

2. The method defined in claim 1, wherein decrypting the first signature is performed using a decryption key, the method further comprising receiving an index accompanying the first signature; and consulting a database that stores potential keys associated with respective indexes to identify the decryption key as the potential key associated with the index accompanying the first signature.

3. The method defined in claim 1, further comprising consulting a database comprising a plurality of potential keys; wherein the decrypting is performed using a first one of the potential keys.

4. The method defined in claim 3, further comprising comparing the candidate identifier to a set of expected identifiers and, if there is no match, repeating the decrypting using another one of the potential keys until occurrence of: (i) a match between the candidate identifier and one of the expected identifiers; and (ii) exhaustion of all potential keys without finding a match between the candidate identifier and any of the expected identifiers.

5. The method defined in claim 4, further comprising concluding that the validation is unsuccessful in the case of exhaustion of all potential keys without finding a match between the candidate identifier and any of the expected identifiers.

6. The method defined in claim 1, wherein validating comprises determining whether the candidate scrambling code is a member of the set of other scrambling codes associated with the candidate identifier.

7. The method defined in claim 6, further comprising concluding that the validating is unsuccessful if the determining indicates that the candidate scrambling code is a member of the set of other scrambling codes associated with the candidate identifier.

8. The method defined in claim 6, further comprising concluding that the validating is not unsuccessful if the determining indicates that the candidate scrambling code is not a member of the set of other scrambling codes associated with the candidate identifier.

9. The method defined in claim 6, further comprising updating the set of other scrambling codes associated with the candidate identifier to include the candidate scrambling code.

10. The method defined in claim 1, wherein validating comprises determining a number of times that a signature encoding the candidate scrambling code was received before the first signature.

11. The method defined in claim 10, further comprising concluding that the validating is unsuccessful if the determining indicates that the number of times that a signature encoding the candidate scrambling code was received before the first signature is more than a pre-determined number of times.

12. The method defined in claim 1, wherein validating comprises determining how long ago the candidate scrambling code was first received.

13. The method defined in claim 12, further comprising concluding that the validating is unsuccessful if the determining indicates that the candidate scrambling code was first received more than a pre-determined time interval ago.

14. The method defined in claim 1, wherein the communication pathway comprises a contact-less channel, further comprising issuing a read request to the device over the contact-less channel, wherein receiving the first signature occurs over the contact-less channel subsequent to issuing of the read request.

15. The method defined in claim 1, wherein the communication pathway is non-secure pathway.

16. The method defined in claim 1, wherein the non-secure pathway traverses the Internet.

17. The method defined in claim 1, wherein if the validating is successful, the method further comprises granting access to a resource and wherein if the validating is unsuccessful, the method further comprises denying access to the resource.

18. The method defined in claim 17, wherein the resource comprises at least one of: computing equipment, a computer network, a building, a portion of a building, an entrance, an exit and a vehicle.

19. The method defined in claim 17, wherein the resource comprises at least one of an online resource and a financial resource.

20. The method defined in claim 1, wherein if the validating is successful, the method further comprises authorizing an attempted transaction and wherein if the validating is unsuccessful, the method further comprises denying the attempted transaction.

21. The method defined in claim 20, wherein the transaction comprises a financial transaction.

22. A computer-readable storage medium comprising computer-readable program code which, when interpreted by a computing apparatus, causes the computing apparatus to execute a method that includes:
receiving a first signature from a device;
decrypting the first signature to obtain a candidate identifier and a candidate scrambling code;
consulting a database to obtain a set of other scrambling codes associated with the candidate identifier, the other scrambling codes having been encoded in signatures received before the first signature;
validating the first signature based on a comparison of the candidate scrambling code to the set of other scrambling codes associated with the candidate identifier; and
updating the set of other scrambling codes associated with the candidate identifier to include the candidate scrambling code.

23. A system for processing signatures received from devices, comprising:
an interrogation portion configured to receive a first signature from a particular device; and
a processing portion configured to:
decrypt the first signature in order to obtain a candidate identifier and a candidate scrambling code;
consult a database in order to obtain a set of other scrambling codes associated with the candidate identifier, the other scrambling codes having been encoded in signatures received before the first signature;
validate the first signature based on a comparison of the candidate scrambling code to the set of other scrambling codes associated with the candidate identifier; and
update the set of other scrambling codes associated with the candidate identifier to include the candidate scrambling code.

24. The system defined in claim 23, further comprising a network controller communicatively coupled to the interrogation portion and configured to implement the processing portion.

25. The system defined in claim 23, wherein to validate the first signature, the processing portion is configured to carry out a determination of whether the candidate scrambling code is a member of the set of other scrambling codes associated with the candidate identifier.

26. The system defined in claim 25, wherein the processing portion is further configured to conclude that validation of the first signature is unsuccessful if the determination indicates that the candidate scrambling code is a member of the set of other scrambling codes associated with the candidate identifier.

27. The system defined in claim 25, wherein the processing portion is further configured to conclude that the validation of the first signature is not unsuccessful if the determination indicates that the candidate scrambling code is not a member of the set of other scrambling codes associated with the candidate identifier.

28. The system defined in claim 25, wherein the processing portion is one among a plurality of processing portions spatially distributed over a plurality of sites, the processing portions being communicatively coupled to one another to enable the determination to be made jointly by the plurality of processing portions.

29. The system defined in claim 23, wherein the processing portion is distributed among a plurality of spatially distributed sites.

30. The system defined in claim 23, wherein the interrogation portion is one among a plurality of interrogation portions spatially distributed over a plurality of sites.

31. The system defined in claim 23, wherein to validate the first signature, the processing portion is configured to effect a determination of a number of times that a signature encoding the candidate scrambling code was received before the first signature.

32. The system defined in claim 31, wherein the processing portion is further configured to conclude that validation of the first signature is unsuccessful if the determination is indicative that the number of times that a signature encoding the candidate scrambling code was received before the first signature is more than a pre-determined number of times.

33. The system defined in claim 23, wherein to validate the first signature, the processing portion is configured to effect a determination of how long ago the candidate scrambling code was first received.

34. The system defined in claim 33, wherein the processing portion is further configured to conclude that validation of the first signature is unsuccessful if the determination is indicative of the candidate scrambling code having been first received more than a pre-determined time interval ago.

35. The system defined in claim 23, wherein if the validating is successful, the processing portion is configured to grant access to a resource and wherein if the validating is unsuccessful, the processing portion is configured to deny access to the resource.

36. The system defined in claim 35, wherein the resource comprises at least one of: computing equipment, a computer network, a building, a portion of a building, an entrance, an exit and a vehicle.

37. The system defined in claim 35, wherein the resource comprises at least one of an online resource and a financial resource.

38. The system defined in claim 23, wherein if the validating is successful, the processing portion is configured to authorize an attempted transaction and wherein if the validating is unsuccessful, the processing portion is configured to deny the attempted transaction.

39. The system defined in claim 38, wherein the transaction comprises a financial transaction.

* * * * *